(12) United States Patent
Yamashita et al.

(10) Patent No.: US 8,034,169 B2
(45) Date of Patent: Oct. 11, 2011

(54) AIR CLEANER

(75) Inventors: Hiroyasu Yamashita, Osaka (JP);
Yoshihiko Matsubara, Itami (JP);
Nobuhiro Iwaki, Kashiba (JP);
Masahiro Takemoto, Higashiosaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 460 days.

(21) Appl. No.: 12/375,492

(22) PCT Filed: Jun. 22, 2007

(86) PCT No.: PCT/JP2007/062570
§ 371 (c)(1),
(2), (4) Date: Jan. 28, 2009

(87) PCT Pub. No.: WO2008/015851
PCT Pub. Date: Feb. 7, 2008

(65) Prior Publication Data
US 2009/0314164 A1 Dec. 24, 2009

(30) Foreign Application Priority Data

Aug. 3, 2006 (JP) .................................. 2006-211938
Aug. 3, 2006 (JP) .................................. 2006-211965

(51) Int. Cl.
*A61L 9/16* (2006.01)
*F24F 6/04* (2006.01)
(52) U.S. Cl. ................. 96/245; 96/258; 96/380; 261/63; 261/96; 261/DIG. 34
(58) Field of Classification Search .................... 96/245, 96/258, 296, 380, 317; 261/38, 63, 94–96, 261/100, DIG. 34
See application file for complete search history.

(56) References Cited

U.S. PATENT DOCUMENTS 5,368,784 A * 11/1994 Annestedt, Sr. .............. 261/105
2003/0070544 A1* 4/2003 Mulvaney et al. ................ 95/25

FOREIGN PATENT DOCUMENTS

| JP | 7-120025 A | 5/1995 |
| JP | 11-48745 A | 2/1999 |
| JP | 11-63584 A | 3/1999 |
| JP | 2002-106969 A | 4/2002 |
| JP | 2003-56873 A | 2/2003 |
| JP | 2003-135575 A | 5/2003 |
| JP | 2005-300089 A | 10/2005 |
| JP | 2006-46729 A | 2/2006 |
| JP | 2006-71113 A | 3/2006 |

* cited by examiner

*Primary Examiner* — Frank Lawrence, Jr.
(74) *Attorney, Agent, or Firm* — Birch, Stewart, Kolasch & Birch, LLP (57) ABSTRACT

An air cleaner that is capable of efficiently and effectively purifying and humidifying air. An air flow passage from air filters (4, 5) to a blower (8) is branched to first and second air flow passages (31, 32), and then these air flow passages join. A humidifying filter (14) is disposed in the first air flow passage (31), and a movable plate (35) for opening and closing the humidifying filter is disposed in the second air flow passage (32). The air cleaner comprises a control part (40) for controlling the opening and closing operation of the movable plate (35) and the rotating operation of the blower (8). A recess containing the air filters (4, 5) is formed in the front of the body (2) of the air cleaner. An air flow passage extending from under the recess to the back of the recess and bent upward is horizontally partitioned into upper and lower parts by a partition wall (27) to form the first air flow passage (31) and the second flow passage (32) in this order from the bottom. The movable plate (35) is a flat plate rotated around a pivotal axis (36) formed along one lateral side.

7 Claims, 6 Drawing Sheets

FIG.6

AIR CLEANER

TECHNICAL FIELD

The present invention relates to an air cleaner for cleaning air in a room, and more particularly to an air cleaner that has a humidifying function as well.

BACKGROUND ART

Various matters such as dust, pollen, tobacco smoke, breathed-out air and the like that are disagreeable or harmful to the human body are contained in air in a room (room air). Especially, in recent years, because houses are often closed completely, such harmful matters easily collect in a room. Accordingly, conventionally, windows of a room are sometimes opened for spontaneous ventilation. However, as a matter of fact, it is hard to carry out spontaneous ventilation as desired in an area where air pollution is serious, at home or in an office if there is a family member or a colleague who is suffering from hay fever. In such situation, an air cleaner that has an air cleaning function to clean room air is generally becoming widespread.

Generally, an air cleaner is equipped with an air filter on the front of its main body, and an air flow passage in which a blower is disposed is formed inside the main body. The air flow passage extends from an opening of the main-body front to an outlet of an upper portion of the main body. Such an air cleaner sucks room air, that is, outside air into the air flow passage through the air filter as the blower rotates, and sends out the sucked air into the room, that is, the outside through the outlet. Here, harmful matters contained in the air are caught, adsorbed, or decomposed by the air filter to be removed so that the air is cleaned.

Further, for the purpose of adjusting room air to obtain a more comfortable condition, some air cleaners have a humidifying function besides the air cleaning function. In an air cleaner having the humidifying function, a humidifying filter that contains water is so disposed as to close a portion of the sectional region of the air flow passage, and part of the air that is cleaned by the air filter absorbs water when it goes through the humidifying filter, thereby the air is humidified (e.g., see patent document 1).
[Patent document 1]: JP-A-2006-46729

DISCLOSURE OF THE INVENTION

Problems to be Solved by the Invention

In the conventional air cleaner having an air humidifying function described above, both the capability of cleaning air and the capability of humidifying air directly depend on an air flow amount, that is, a rotation speed of the blower. In other words, if the air flow amount, that is, the rotation speed of the blower is raised, both capabilities increase at the same time, and to the contrary, if the air flow amount, that is, the rotation speed of the blower is lowered, both capabilities fall at the same time. Accordingly, for example, if humidity is low and it is desired to powerfully operate the humidifying function, the rotation speed of the blower is increased to raise the humidifying power. However, because only part of the air flowing though the air flow passage passes through the humidifying filter, the humidifying efficiency is not very good. If the rotation speed of the blower is excessively increased, noise is generated.

To remove such disadvantages, if the humidifying filter is so disposed as to close substantially the entire portion of the sectional region of the air flow passage, almost all the air flowing through the air flow passage passes through the humidifying filter, thereby the humidifying efficiency rises. In a case where it is desired to operate only the air cleaning function because the humidity is sufficiently high to an agreeable extent but the air is dirty, the rotation speed of the blower is raised to increase the air cleaning power. However, here, because the humidifying power also increases invariably following the raised air cleaning power, the humidity rises unnecessarily to an uncomfortable level. If the rotation speed of the blower is lowered, the humidity is kept at an agreeable level. However, the air cleaning function does not work so sufficiently as needed.

The present invention has been made to cope with the conventional problems, and it is an object of the present invention to provide an air cleaner that is capable of cleaning and humidifying air efficiently and effectively.

Means for Solving the Problem

To achieve the object, an air cleaner according to the present invention sucks outside air through an air filter following rotation of a blower disposed in an air flow passage, cleans the sucked air, and sends out the cleaned air to the outside, wherein an air flow passage that extends from the air filter to the blower branches off into a first air flow passage and a second air flow passage which join with each other again; a humidifying filter that contains water and is disposed in the first air flow passage; a movable plate that is disposed in the second air flow passage to open and close the second air flow passage; and a control portion that controls open and close operation of the movable plate and rotation operation of the blower.

According to this structure, in a state where the movable plate closes the second air flow passage, air cleaned by the air filter flows into the first air flow passage, passes through the humidifying filter, absorbs water from the humidifying filter when passing through the humidifying filter so that the air is humidified, then the air is sent out to the outside. Thus, here, not only the air cleaning but also the humidifying is efficiently carried out. To the contrary, in a state where the movable plate opens the second air flow passage, most of the air cleaned by the air filter flows out through the second air flow passage, and part of the air is humidified by the humidifying filter and flows out through the first air flow passage, the air flowing through the second air flow passage and the air flowing through the first air flow passage join with each other and is sent out to the outside. Thus, here, the humidifying is carried out at low efficiency, and the air cleaning is chiefly performed.

The air cleaner described above may be so structured as to comprise: a recess portion that is formed at a front of a main body and houses the air filter; and an air flow passage that extends inward (toward the inner part of the main body) from an lower portion of the recess portion, turns upward, and leads to the blower, and the air flow passage is partitioned into upper and lower portions to form a first air flow passage and a second air flow passage in order from the bottom, wherein the movable plate is a curved plate that is curved into an arc shape about a pivotal shaft extending along a right-to-left direction and rotates about the pivotal shaft, the movable plate rotates to the most forward position to close the second air flow passage, and rotates to the most backward position not only to open the second air flow passage and but also to close the join opening of the first air flow passage.

According to this structure, in a state where the movable plate closes the second air flow passage, air cleaned by the air filter flows into the first air flow passage, passes through the humidifying filter, absorbs water from the humidifying filter when passing through the humidifying filter so that the air is humidified, then the air is sent out to the outside. Thus, here, not only the air cleaning but also the humidifying is efficiently carried out. To the contrary, in a state where the movable plate opens the second air flow passage and closes the join opening of the first air flow passage, the air cleaned by the air filter flows not into the first air flow passage but into the second air flow passage, and is sent out to the outside. Thus, here, the humidifying is hardly carried out, and the air cleaning is chiefly performed.

Advantages of the Invention

In the air cleaner according to the present invention, the movable plate is opportunely opened and closed, thereby it is possible to adjust the humidifying efficiency. As a result of this, it is possible to efficiently carry out both the air cleaning and the humidifying.

LIST OF REFERENCE SYMBOLS 1 air cleaner
2 main body
3 front panel
4 deodorization filter
5 dust filter
8 blower
9 fan motor
10 fan
11 first outlet
12 second outlet
13 operation and indication portion
14 humidifying filter
15 tray
16 water supply tank
17 ion generator
21 partition wall
22 partition wall
23 partition wall
24 opening
25 rear wall
26 protrusion piece
27 partition wall
31 first air flow passage
32 second air flow passage
35, 38 movable plates
36, 39 pivotal shafts
37 protrusion

FIRST EMBODIMENT

Figure 1:
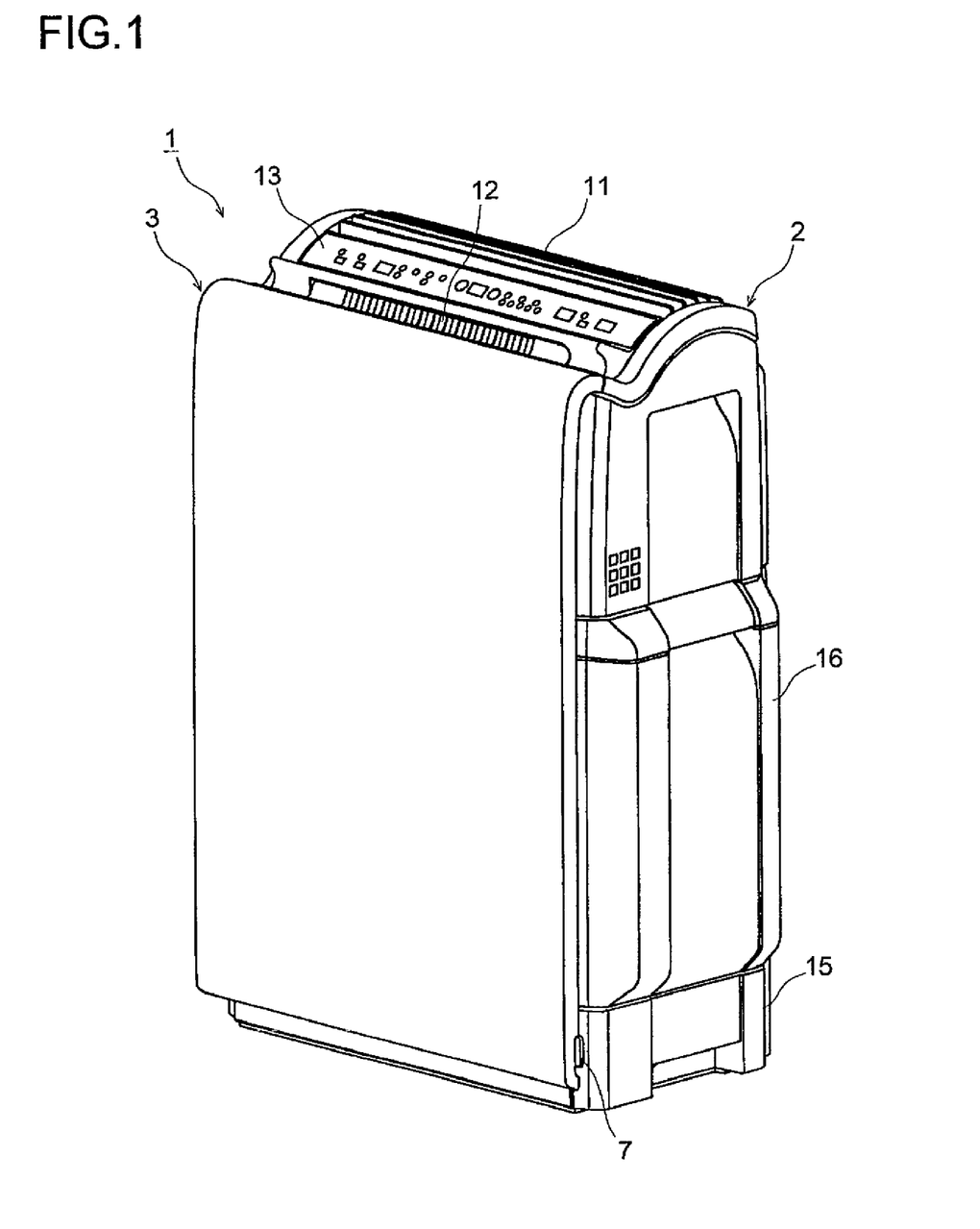
FIG. 1 is a front perspective view showing an appearance of an air cleaner according the present invention.
Figure 2:
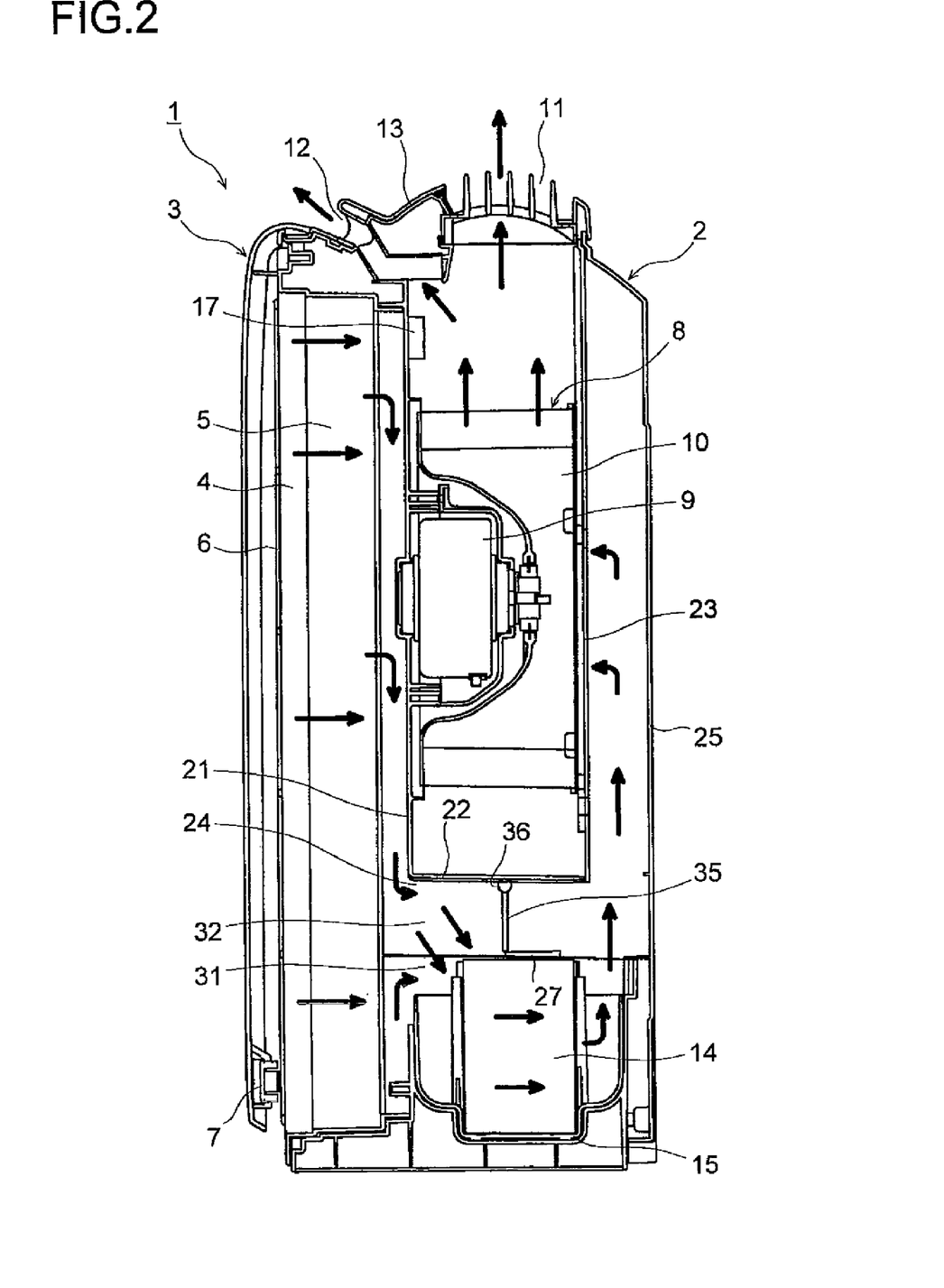
FIG. 2 is a side sectional view showing a state of an internal structure of an air cleaner according to a first embodiment of the present invention in which a movable plate closes a second air flow passage.
Figure 3:
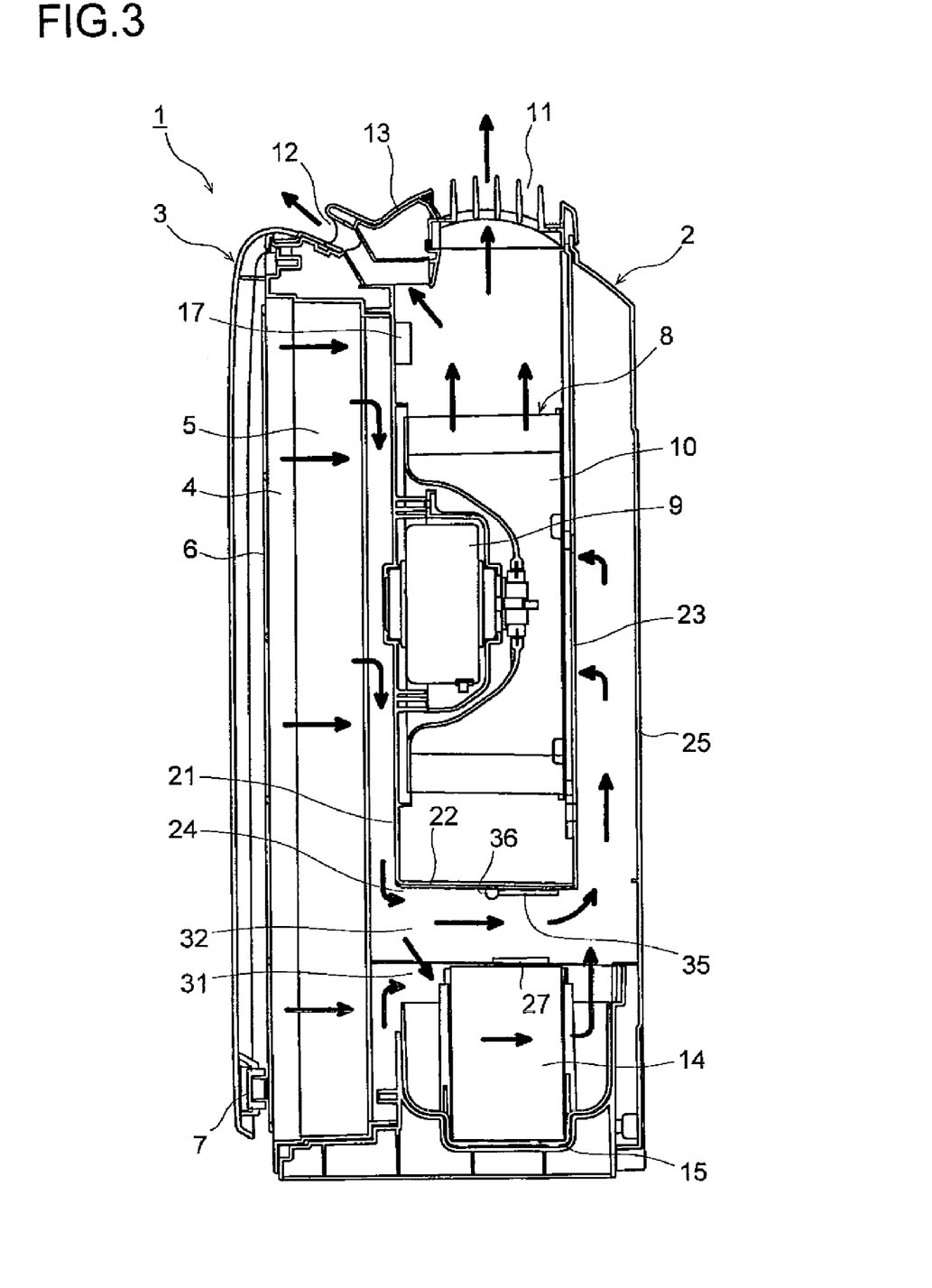
FIG. 3 is a side sectional view showing a state of the internal structure of the air cleaner according to the first embodiment of the present invention in which the movable plate opens the second air flow passage.

Hereinafter, a first embodiment of an air cleaner according to the present invention is described in detail with reference to drawings. The air cleaner described here is an air cleaner with a humidifying function, and also, an example of an air cleaner that has further an ion emission function besides the humidifying function is explained. FIG. 1 is a front perspective view showing an appearance of an air cleaner according to the present invention. FIGS. 2 and 3 are side views showing an internal structure of the air cleaner, in which FIG. 2 shows a state where a movable plate closes a second air flow passage, and FIG. 3 shows a state where the movable plate opens the second air flow passage.

An air cleaner 1 in the present embodiment is placed on a suitable position of a floor or hung on a wall of a room before it is used, and its housing is generally composed of a main body 2 and a front panel 3. The main body 2 has a shape obtained by vertically setting a substantially flat box as a whole, and has in its front an air filter housing portion that is deeply recessed into a rectangular shape. In this air filter housing portion, a deodorization filter 4 and a dust filter 5 as air filters are housed in order from the front-side opening with one laid on the other.

The deodorization filter 4 includes a rectangular frame, a polyester nonwoven fabric mounted on the frame, active carbon evenly disposed on the fabric, and further a polyester nonwoven fabric covered over the active carbon. The deodorization filter 4 serves as an adsorptive that adsorbs odor contents in the air such as acetaldehyde, ammonia, acetic acid and the like. On the other hand, the dust filter 5 is what is called a HEPA (High Efficiency Particulate Air) filter, and has a filter medium that is folded and includes an aggregate formed of a polyester/vinylon nonwoven fabric that is joined with a melt-blow nonwoven fabric to which electromagnetic treatment is applied, antibacterial sheets which are formed of a fabric treated with hydroxyapatite, covered over the upper and lower surfaces of the folded filter medium, and bonded to the folded filter medium by thermo-compression bonding, and frames that are formed of a hot-melt nonwoven fabric and are welded to the antibacterial sheets. The dust filter 5 serves as a filter that catches fine dust.

The deodorization filter 4 and the dust filter 5 housed in the air filter housing portion are held by a filter hold frame 6 that is mounted on an opening of the air filter housing portion so that the air filters are prevented from coming off the air filter housing portion. The filter hold frame 6 has a substantially rectangular shape and a plurality of air flow openings that are arranged into a matrix shape.

At the front of the main body 2 in which the deodorization filter 4 and the dust filter 5 are housed and the filter hold frame 6 is mounted, the front panel 3 is mounted with a given gap away from the front of the main body 2 and completely covers all of the deodorization filter 4, the dust filter 5 and the filter hold frame 6. The front panel 3 is supported by the main body 2 by engaging a hook (not shown), which is bent from an upper portion of the front panel 3 toward the main body 2, with an upper portion of the main body 2, and both of its right and left lower portions are fixed by an engagement portion 7. The gaps between the back surface of the front panel 3 and the front surface of the main body 2 are opened to the outside through the right, left and lower portions, and outside air is introduced through the gaps.

In the main body 2, a blower 8 is disposed in a portion behind the air filter housing portion with a partition wall 21 arranged between the air filter housing portion and the blower 8. The blower 8 is composed of a fan motor 9 and a fan 10, the front side of the blower 8 is covered by the partition wall 21, the lower side is covered by a partition wall 22, and the rear side is covered by a partition wall 23. The fan motor 9 is fixed to the front-side partition wall 21, and a plurality of air flow openings that are opened to the blower 8 are formed through the rear-side partition wall 23. Although a turbo-fan is used as the fan 10, the kind of the fan is not limited to this. It is also possible to use a propeller fan or a cross-flow fan. The turbo-fan is devised to have a large thickness compared with the fan diameter so that noise level is reduced. As the fan motor 9, it is preferable to use a DC motor for easy control.

Besides, the main body 2 is provided with a first outlet 11 that is formed through an upper portion of the main body 2 facing the upper portion of the blower 8 and is opened upward, a second outlet 12 that is opened front upward, and an operation and indication portion 13 that includes operation buttons for turning on and off a power supply and for carrying out operation settings, an indication lamp for indicating operation conditions and the like.

As the blower 8 is driven, that is, the fan 10 is rotated by the fan motor 9, outside air, that is, room air is introduced into the main body 2 from the gaps between the main body 2 and the front panel 3. The introduced air reaches the air filters 4 and 5 through the air flow openings of the filter hold frame 6, and cleaned by the deodorization filter 4 and the dust filter 5 into air that has no odor and dust. The cleaned air reaches the rear wall 25 of the main body 2 through an opening 24 that is formed under the partition wall 21 arranged behind the air filter housing portion, turns upward through a passage formed between the partition wall 23 and the rear wall 25, and is sucked into the center of the fan 10 through the air flow openings of the partition wall 23. The air sucked into the center of the fan 10 passes through gaps between the fan blades, is sent out from the circumference of the fan 10, guided upward and sent out through the first outlet 11 and the second outlet 12 into the outside, that is, the room. Thus, the air flow goes through the air flow passages.

In the present embodiment, the air flow passage that extends from the opening 24 formed under the partition wall 21 arranged behind the air filter housing portion toward the inner part of the main body 2 along the partition wall 22 is partitioned by a partition wall 27 into upper and lower portions to form a first air flow passage 31 and a second air flow passage 32 in order from the bottom. In other words, the air flow passage that extends from the air filter to the blower 8 branches off into the first air flow passages 31, 32 and join with each other at an inward position.

A humidifying filter 14 is so disposed in the first air flow passage 31 as to close almost whole portion of the sectional region of the first air flow passage 31. Specifically, a removable tray 15 is housed from one side portion into a lower portion of the main body 2, and water is poured into the tray 15 to a predetermined water level. The humidifying filter 14 is formed of a water absorbent that is folded zigzag, inserted into the tray 15 with the lower portion immersed in the water, sucks up water from the tray 15 and contains it. A water supply tank 16 holding water is connected to the tray 15, and water is opportunely supplied to the tray 15. The water supply tank 16 is removably housed in a portion of the side of the main body 2 where the tray 15 is housed.

On the other hand, a movable plate 35 is disposed in the second air flow passage 32 to open and close the second air flow passage 32. In the present embodiment, the movable plate 35 is a simple flat plate that is supported at one end of the plate by a pivotal shaft 36 which is so disposed along a right to left direction as to be in contact with the partition wall 22 so that the movable plate 35 rotates about the pivotal shaft 36. Rotation driving of the movable plate 35 is performed by a digital-control motor such as a stepping motor and the like. Accordingly, the rotation position of the movable plate 35 is always detected.

As shown in FIG. 2, when the movable plate 35 is rotated to the most forward position, that is, a vertical-direction position by the digital-control motor, the movable plate 35 completely close the second air flow passage 32. In this state, if the blower 8 is driven, the air cleaned by the air filters flows into the first air flow passage 31 because the second air flow passage 32 is closed by the movable plate 35, and reaches the humidifying filter 14. When the air passes through the humidifying filter 14, the air absorbs water from the humidifying filter 14 to be humidified. Then, the air goes upward through the passage between the partition wall 23 and the rear wall 25, and is finally sent out into the outside through the first outlet 11 and the second outlet 12. Thus, in this case, not only the air cleaning but also the humidifying is efficiently carried out.

To the contrary, as shown in FIG. 3, when the movable plate 35 is rotated to the most backward position, that is, a horizontal-direction position by the digital-control motor, the movable plate 35 completely opens the second air flow passage 32. In this state, if the blower 8 is driven, part of the air cleaned by the air filters flows into the second air flow passage 32 because the second air flow passage 32 is opened. Of course, part of the air flows into the first air flow passage 31 because the first air flow passage 31 is always opened. However, because the humidifying filter 14 that impedes the air flow is present in the first air flow passage 31, the flow amount into the first air flow passage 31 is much less than that into the second air flow passage 32. Accordingly, in this case, most of the air cleaned by the air filters flows out through the second air flow passage 32, while only a little part of the air is humidified by the humidifying filter 14 and flows out through the first air flow passage 31. The air flowing through the first air flow passage 1 and the air flowing through the second air flow passage 32 join later with each other, flows upward through the passage between the partition wall 23 and the rear wall 25, and is finally sent out to the outside from the first outlet 11 and the second outlet 12. Thus, in this case, the humidifying is carried out at low efficiency, while the air cleaning is chiefly carried out.

As described above, in the air cleaner 1 according to the present embodiment, because the movable plate 35 is opportunely driven to open and close the second air flow passage 32, the humidifying efficiency can be adjusted, and as a result of this, it is possible to efficiently and effectively carry out both the air cleaning and the humidifying.

Besides, even if the total air flow amount is the same, the ratio of the air flowing into the first air flow passage 31 to the air flowing into the second air flow passage 32 changes depending on an open degree of the second air flow passage 32, and it is possible to adjust the humidifying efficiency according to the ratio. Accordingly, as rotation positions of the movable plate 35 driven by the digital-control motor, besides the vertical- and horizontal-direction positions, several other positions between the vertical-direction position and the horizontal-direction position may be used.

In the present embodiment, an ion generator 17 that generates positive and negative ions at the same time or either one of them separately is disposed between the second outlet 12 and the blower 8. If the ion generator 17 is driven, ions from the ion generator 17 are emitted into the air flowing from the fan 10 to chiefly the second air flow passage 12, thereby the cleaned air, and besides, the humidified air contains ions and is sent out into the room from chiefly the second air flow passage 12.

In the present embodiment, the movable plate 35 is a flat plate that rotates about the pivotal shaft 36 extending along a right to left direction. However, the movable plate 35 is not limited to such a flat plate, and a flat plate that rotates about a pivotal shaft extending along a vertical direction may be used. Besides, the open and close mechanism of the movable plate 35 for the second air flow passage 12 is not limited to the rotational mechanism, and a slide mechanism may be used. The positions where the first and second air flow passages 31, 32 are formed are not limited to the portion under the partition wall 21 behind the air filter housing portion, specifically, a portion over, or a portion alongside the partition wall 21 may be used, and the first and second air flow passages 31, 32 may be formed away from each other.

Figure 4:
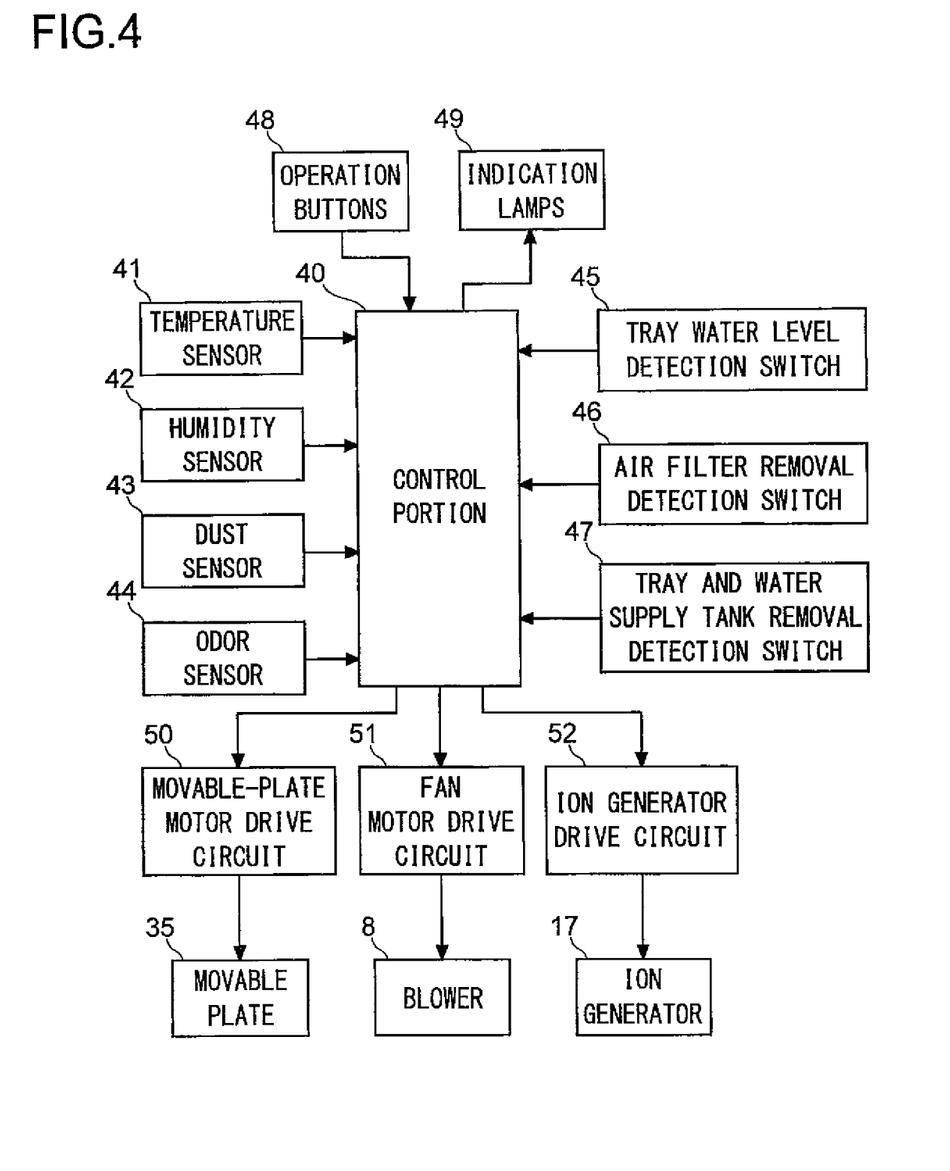
FIG. 4 is a block diagram showing a main structure for operation of an air cleaner according to the present invention.

FIG. 4 shows a block diagram of a main structure for operation of the air cleaner 1. The whole operation of the air cleaner 1 is controlled by a control portion 40. Various sensors such as a temperature sensor 41, a humidity sensor 42, a dust sensor 43, and an odor sensor 44 are connected to the control portion 40. The temperature sensor 41 detects the temperature of room air. The humidity sensor 42 detects the humidity of room air. Generally, the temperature sensor 41 and the humidity sensor 42 are united with each other. The dust sensor 43 includes a light emitting device and a light receiving device, and detects particles floating in room air such as dust and the like. The odor sensor 44 is a semiconductor gas sensor that uses a phenomenon that if gas is adsorbed on the surface of a sensor composed of a metal oxide semiconductor, the resistance value changes. The odor sensor 44 detects odor in room air. In other words, the dust sensor 43 and the odor sensor 44 function as dirt sensors that detect the dirt level of room air. Detected values from the temperature sensor 41, the humidity sensor 42, the dust sensor 43, and the odor sensor 44 are outputted to the control portion 40.

Besides, various detection switches such as a tray water level detection switch 45, an air filter removal detection switch 46, and a tray and water supply tank removal detection switch 47 are connected to the control portion 40. The tray water level detection switch 45 detects that the water held in the tray 15 reduces through a usual water level to reach a water-shortage level. If the water in the tray 15 reaches a water-shortage level, it means a situation that the water supply tank 16 is empty and water supply is needed. The air filter removal detection switch 46 detects that the front panel 3 is removed, further the filter hold frame 6, the deodorization filter 4, and the dust filer 5 are removed. The tray and water supply tank removal detection switch 47 detects that the tray 15 and the water supply tank 16 are removed.

Further, various operation buttons 48 and various indication lamps 49 that compose the operation and indication portion 13 are connected the control portion 40. As the operation buttons 48, there are included a power-supply button for turning on and off the power supply, an air cleaning mode setting button for setting operation modes for the air cleaning function, a humidifying mode setting button for setting operation modes for the humidifying function, an ion emission button for starting and stopping emission of ions and the like. At every time when the air cleaning mode setting button is pressed, the operation mode for air cleaning is changed from automatic air flow amount, small air flow amount, and to large air flow amount. At every time when the humidifying mode setting button is pressed, the operation mode for humidifying is changed from automatic humidifying, weak humidifying, powerful humidifying, and to humidifying stop. Inputs on the operation buttons 48 according to operation by the user are outputted to the control portion 40.

As the indication lamps 49, there are included a power-supply indication lamp that goes on and out to indicate on and off of the power supply according to operation of the power-supply button, an air cleaning operation-mode indication lamp that goes on to indicate an operation mode for air cleaning according to operation of the air cleaning mode setting button, a humidifying operation-mode indication lamp that goes on to indicate an operation mode for humidifying according to operation of the humidifying mode setting button, an ion emission indication lamp that goes on and out to indicate on and off of ion emission according to operation of the ion emission button, a humidity indication lamp that indicates the current humidity level, a water supply indication lamp that goes on to demand water supply to the water supply tank 16 and the like. The indication lamps 49 go on and out following an instruction from the control portion 40. Indication of the humidity indication lamp is based on a detected value from the humidity sensor 42. Indication of the water supply indication lamp is carried out in response to a detected output from the tray water level detection switch 45.

In addition, there are connected to the control portion 40 a movable-plate motor drive circuit 50 that controls rotation driving (open and close operations of the movable plate 35) of the digital-control motor which rotates the movable plate 35, a fan motor drive circuit 51 that controls rotation driving (rotation operation of the blower 8) of the fan motor 9 of the blower 8, and an ion generator drive circuit 52 that controls driving of the ion generator 17. Based on input operations on the operation buttons 48, detected values from the various sensors, and detected outputs from the various detection switches, instructions are transmitted from the control portion 40 to the movable-plate motor drive circuit 50, the fan motor drive circuit 51, and the ion generator drive circuit 52, thereby the movable plate 35, the blower 8, and the ion generator 17 are driven.

SECOND EMBODIMENT

Hereinafter, a second embodiment of an air cleaner according to the present invention is described in detail with reference to drawings. In the present embodiment, the appearance of the air cleaner is the same as that shown in the first embodiment. The internal structure is different from the first embodiment in portions around the movable plate shown in FIGS. 2 and 3 of the first embodiment, and the main structure for operation of the air cleaner is the same as the structure shown in FIG. 4 described in the first embodiment. Hereinafter, description is carried out focusing on the internal structure portion different from that in the first embodiment. The same members as those in the first embodiment are indicated with the same reference numbers, and detailed description is skipped.

Figure 5:
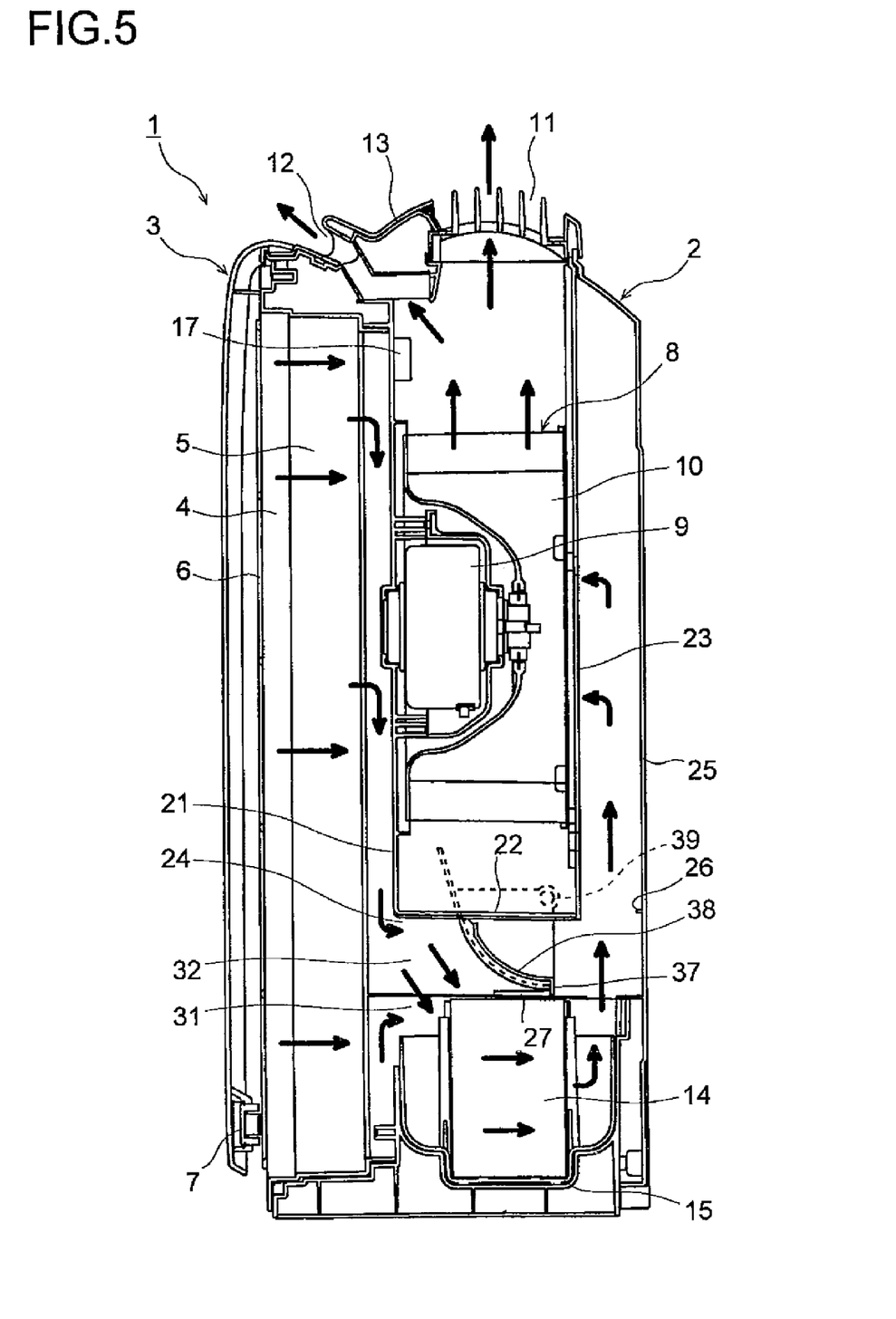
FIG. 5 is a side sectional view showing a state of an internal structure of an air cleaner according to a second embodiment of the present invention in which a movable plate closes a second air flow passage.
Figure 6:
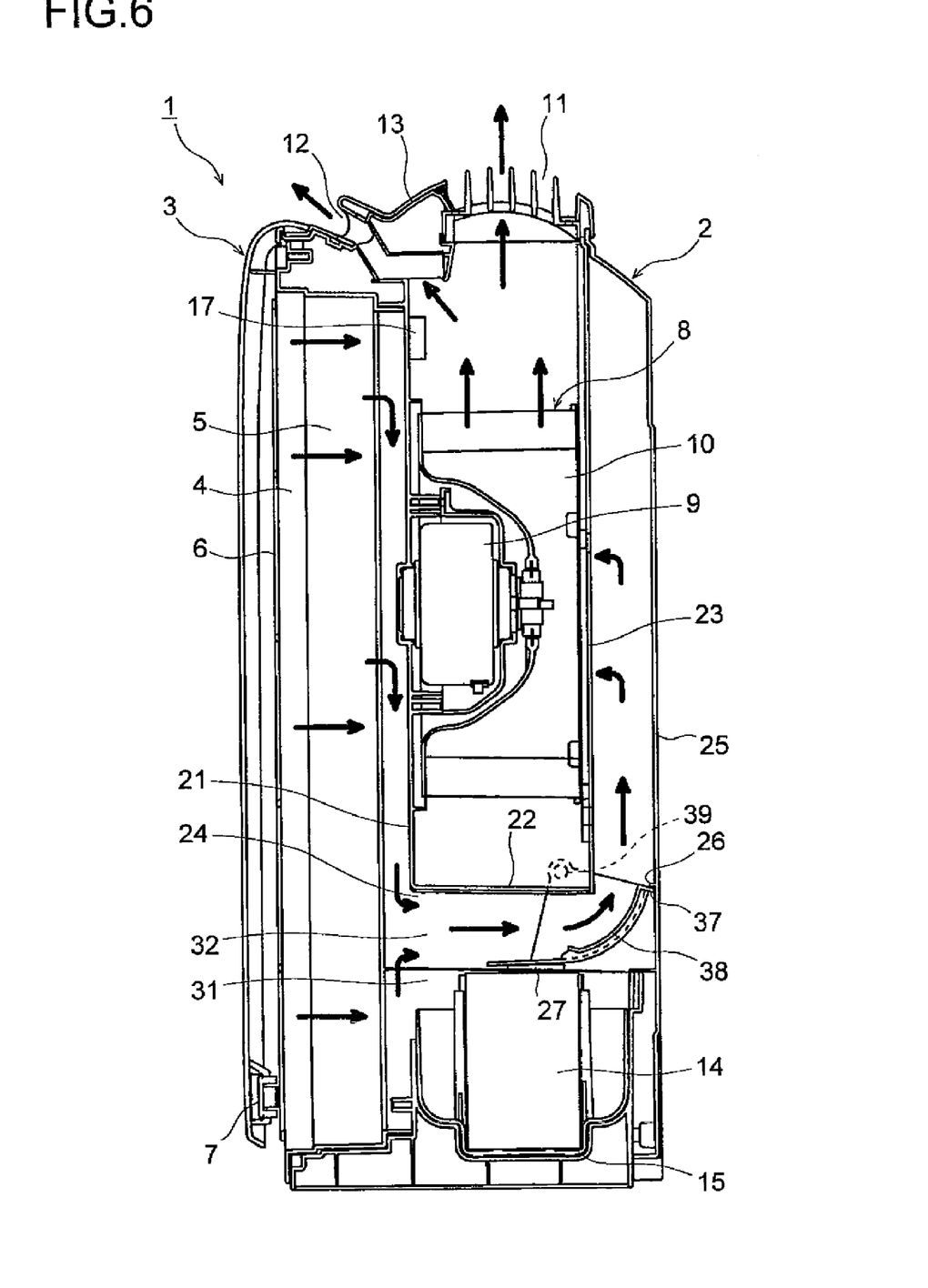
FIG. 6 is a side sectional view showing a state of the internal structure of the air cleaner according to the second embodiment of the present invention in which the movable plate opens the second air flow passage.

FIGS. 5 and 6 are side sectional views showing an internal structure of the air cleaner, in which FIG. 5 shows a state where a movable plate closes the second air flow passage, and FIG. 6 shows a state where the movable plate opens the second air flow passage.

A movable plate 38 that opens and closes the second air flow passage 32 is disposed in the second air flow passage 32.

In the present embodiment, the movable plate 38 is a curved plate that is supported by a pivotal shaft 39 and curved into an arc shape about the pivotal shaft 39 which is disposed along a right to left direction at a position a little upward from the second air flow passage 32 so that the movable plate 38 rotates about the pivotal shaft 39. Rotation driving of the movable plate 38 is performed by a digital-control motor such as a stepping motor and the like. Accordingly, the rotation position of the movable plate 38 is always detected.

Limit rotation positions of the movable plate 38 are set. As shown in FIG. 5, a protrusion 37 that protrudes outward from a back edge of the movable plate 38 hits an end surface of the inner part of the partition wall 27, thereby the rotation of the movable plate 38 is limited to the most forward position, and in this position, the movable plate 38 closes the second air flow passage 32. In this state, if the blower 8 is driven, the air cleaned by the air filters flows into the first air flow passage 31 because the second air flow passage 32 is closed by the movable plate 38, and reaches the humidifying filter 14. When the air passes through the humidifying filter 14, the air absorbs water from the humidifying filter 14 to be humidified. Then, the air goes upward through the passage between the partition wall 23 and the rear wall 25, and is finally sent out into the outside through the first outlet 11 and the second outlet 12. Thus, in this case, not only the air cleaning but also the humidifying is efficiently carried out.

To the contrary, as shown in FIG. 6, the protrusion 37 of the movable plate 38 hits a protrusion piece 26 that protrudes from the rear wall 25, thereby the rotation of the movable plate 38 is limited to the most backward position, and in this position, the movable plate 38 opens the second air flow passage 32 and closes the join opening of the first air flow passage 31. In this state, if the blower 8 is driven, the air cleaned by the air filters does not flow into the first air flow passage 31 because the join opening of the first air flow passage 31 is closed by the movable plate 38, instead flows into the second air flow passage 32 because the second air flow passage 32 is opened. The air is guided by the movable plate 38, then flows upward through the passage between the partition wall 23 and the rear wall 25, and is finally sent out to the outside from the first outlet 11 and the second outlet 12. Thus, in this case, the humidifying is hardly carried out, while the air cleaning is chiefly carried out.

As described above, in the air cleaner 1 according to the present embodiment, because the movable plate 35 is opportunely driven to open and close the second air flow passage 32, the humidifying efficiency can be adjusted, and as a result of this, it is possible to efficiently and effectively carry out both the air cleaning and the humidifying.

Next, an example of driving each of the movable plates 35, 38, the blower 8, and the ion generator 17 by the control portion 40 is described below.

In the first and second embodiments, the control portion 40 adjusts the operation of the blower 8, that is, the rotation speed of the fan motor 9 based on a detected value from at least one of the dust sensor 43 and the odor sensor 44. Specifically, in the humidifying stop mode, when the air cleaning is in operation under the automatic air flow amount mode, the rotation speed of the fan motor 9 is changed step by step according to detected values from the dust sensor 43 and the odor sensor 44. For example, if it is determined from a detected value that the air is dirty, the fan motor 9 is rotated at a high speed to produce a large amount of air flow, thereby the air cleaning function is powerfully carried out. If it is determined from a detected value that the air is cleaned, from the view point of curbing noise and power consumption, the rotation speed of the fan motor 9 is changed to a low speed to produce a small amount of air flow, thereby the air cleaning function is kept at a low level. If it is determined again that the air is dirty, the rotation speed of the fan motor 9 is changed to a high speed. This operation is repeated. Thus, it is possible to clean room air. Here, during the operation, the movable plates 35, 38 are situated at the position to open the second air flow passage 32.

In the first and second embodiments, the control portion 40 drives the movable plates 35 to open and close the second air flow passage 32 based on detected values from the humidity sensor 42. Specifically, in a case where the humidifying is in operation under the automatic humidifying mode with a target humidity set, for example, to 60%, if a detected value from the humidity sensor 42 indicates a humidity of 60% or higher, the movable plate 35 is rotated to open the second air flow passage 32, thereby the humidity efficiency is lowered. On the other hand, if the humidity is lower than 60%, the movable plates 35 are rotated to close the second air flow passage 32, thereby the humidifying efficiency is raised. Thus, it is possible to adjust the humidity of room air to the set target humidity.

Also, the operation of the blower 8, that is, the rotation speed of the fan motor 9 may be adjusted at the same time. Specifically, if a detected value from the humidity sensor 42 indicates the set target humidity or higher, the movable plates 35, 38 are rotated to open the second air flow passage 32, and at the same time, the rotation speed of the fan motor 39 is lowered, thereby the humidity efficiency is decreased. On the other hand, if the humidity is lower than the target humidity, the movable plates 35, 38 are rotated to close the second air flow passage 32, and at the same time, the rotation speed of the fan motor 9 is increased, thereby the humidifying efficiency is raised. Thus, it is possible to adjust the humidity of room air closer to the target humidity.

In theses cases, if a detected value from the humidity sensor 42 indicates that the humidity is changed from a humidity lower than the target humidity to the target humidity or higher, the movable plates 35, 38 are rotated to change the closed state of the second air flow passage 32 to the opened state, and at the same time, the rotation speed of the fan motor 9 is changed from a high speed to a low speed. As for the changeover order, it is better to change first the rotation speed of the fan motor 9, then to change the rotation positions of the movable plates 35, 38. If the rotation positions of the movable plates 35, 38 are changed first to open the second air flow passage 32, because a large amount of air flows into the second air flow passage 32 that is opening, a whistling noise is generated.

In the automatic humidifying mode, besides the operation method described above, another method also is possible, in which the movable plates 35, 38 are held at the position to close the second air flow passage 32 so that the air always flows into the first air flow passage 31, and at the same time, the rotation speed of the fan motor 9, that is, the air flow amount is controlled, thereby the humidifying efficiency is adjusted.

During the operation in the automatic humidifying mode, in a situation where the humidity does not reach a set target humidity even if a given time elapses, the rotation speed of the fan motor 9 may be raised by one step. In such a situation, it is high in possibility that the air cleaner 1 is being operated in a room that has an area larger than that specified in the specification, and it can be thought that the humidifying power is insufficient at the rotation speed set for an area specified in the specification.

In the first embodiment, if the control portion 40 receives an input operation from the operation button 48 for an open/ close changeover of the movable plate 35 with respect to the second air flow passage 32, the control portion 40 changes the open/close state of the movable plate 35, and at the same time, changes the operation of the blower 8, that is, the rotation speed of the fan motor 9 so that the air flow amount becomes substantially the same before and after the open/close changeover of the movable plate 35. Specifically, for example, if it is changed from the state where the air cleaning is being carried out in the humidifying stop mode to the humidifying operation state, the movable plate 35 rotates to change the state of the second air flow passage 32 from the opened state to the closed state, thereby the air flow passage is changed from the second air flow passage 32 to the first air flow passage 31. Here, there is no resistance to the air flow in the second air flow passage 32 that serves as the air flow passage before the changeover, while the humidifying filter 14, that is, resistance to the air flow is present in the first air flow passage 31 that serves as the air flow passage after the changeover. Accordingly, even if the rotation speed of the fan motor 9 is the same before and after the changeover, the air flow amount becomes different in effect before and after the changeover. To prevent this, when carrying out the changeover, the rotation speed of the fan motor 9 is so set that the rotation speed at the time when the humidifying operation is carried out with the second air flow passage 32 closed becomes higher than the speed at the time when the air cleaning operation is carried out with the second air flow passage 32 opened. Thus, the air flow amount becomes substantially the same before and after the changeover, and as a result of this, the air cleaning power is unchanged. For this purpose, correlation data between the rotation speed of the fan motor 9 and the air flow amount are obtained in pretests of the air cleaning operation carried out with the second air flow passage 32 opened and of the humidifying operation with the second air flow passage 32 closed, and a rotation speed to be set is selected from the data.

However, if the operation is changed from the air cleaning operation to the humidifying operation in the powerful humidifying mode, it means that the user intends to carry out the powerful humidification. Accordingly, in such a case, the fan motor 9 is rotated at a so high speed as to obtain a large amount of air flow irrespective of the air flow amount before and after the changeover.

In the first embodiment, if the control portion 40 receives an input operation from the operation button 48 for an open/close changeover of the movable plate 35 with respect to the second air flow passage 32, the control portion 40 changes the open/close state of the movable plate 35, and at the same time, changes the operation of the blower 8, that is, the rotation speed of the fan motor 9 so that the noise level becomes substantially the same before and after the open/close changeover of the movable plate 35. Specifically, for example, if it is changed from the state where the air cleaning is being carried out in the humidifying stop mode to the humidifying operation state, the movable plate 35 rotates to change the state of the second air flow passage 32 from the opened state to the closed state, thereby the air flow passage is changed from the second air flow passage 32 to the first air flow passage 31. Here, there is no resistance to the air flow in the second air flow passage 32 that serves as the air flow passage before the changeover, while the humidifying filter 14, that is, resistance to the air flow is present in the first air flow passage 31 that serves as the air flow passage after the changeover. Accordingly, even if the rotation speed of the fan motor 9 is the same before and after the changeover, the noise level becomes different in effect before and after the changeover. To prevent this, when carrying out the changeover, the rotation speed of the fan motor 9 is so set that the rotation speed at the time when the humidifying operation is carried out with the second air flow passage 32 closed becomes slightly higher than or if necessary equal to the speed at the time when the air cleaning operation is carried out with the second air flow passage 32 opened. Thus, the noise level becomes substantially the same before and after the changeover, and as a result of this, the use does not feel uncomfortable. For this purpose, correlation data between the rotation speed of the fan motor 9 and the noise level are obtained in pretests of the air cleaning operation carried out with the second air flow passage 32 opened and of the humidifying operation with the second air flow passage 32 closed, and a rotation speed to be set is selected from the data.

However, if the operation is changed from the air cleaning operation to the humidifying operation in the powerful humidifying mode, it means that the user intends to carry out the powerful humidification. Accordingly, in such a case, the fan motor 9 is rotated at a so high speed as to obtain a large amount of air flow irrespective of the noise level before and after the changeover.

In the first and second embodiments, during the time when an operation mode (e.g., an operation mode to drive the ion generator 17), which when a given operation time elapses, is stopped or automatically moves to another operation mode, is carried out, if the control portion 40 receives a detected output from the tray water level detection switch 45, the control portion 40 does not indicate water supply until the given operation time elapses. When the given operation time elapses, the water supply indication lamp, that is, one of the indication lamps 49 is turned on to demand water supply to the water supply tank 16. Specifically, if the ion emission button, that is, one of the operation buttons 48 is tuned on, the ion generator 17 is driven for, for example, a given time of about 15 minutes to emit ions. During the time duration, even if there is a detected output from the tray water level detection switch 45, the water supply indication lamp is not turned on immediately. Instead, the driving of the ion generator 17 is continued until the end of the given time, that is, 15 minutes, and after elapse of the given time, the water supply indication lamp is turned on. This answers the intention of the user who desires the ion emission, and even if there is a detected output from the tray water level detection switch 45, at that time, generally, because there is sill some water left in both tray 15 and water tank 16, only a little water, though, there is no problem for the driving of the ion generator 17 within a limited time.

In the first and second embodiments, if the control portion 40 receives an input operation for operation stop from the operation button 48, the control portion 40 makes the movable plate 35 rotate to the most forward position (rotate the movable plate 38 to the most forward position, that is, the vertical-direction position) and makes the movable plate 35 keep the most forward position. Specifically, if the power-supply button of the operation buttons 48 is turned off, the movable plates 35, 38 are rotated to and held at the position to completely close the second air flow passage 32 irrespective of the air cleaning operation and the humidifying operation. Thus, even if the front panel 3 is removed and further the air filters are removed, because the second air flow passage 32 that extends into the inside is closed by the movable plates 35, 38, inadvertent insertion of fingers and the like can be prevented, which is safe.

From the view point of safety like in the above case, if the control portion 40 receives a detected output from the air filter removal detection switch 46, the control portion 40 may rotate the movable plate 35 to the most forward position (rotate the movable plate 38 to the most forward position, that is, the vertical-direction position) and make the movable plate 35 keep the position. This is because the second air flow passage 32 extending into the inside is closed by the movable plates 35, 38 even if the front panel 3 is removed and further the air filters are removed during the operation. Besides, if the control portion 40 receives a detected output from the tray and water supply tank removal detection switch 47, the control portion 40 may rotate the movable plate 35 to the most forward position (rotate the movable plate 38 to the most forward position, that is, the vertical-direction position) and makes the movable plate 35 keep the most forward position.

In the first and second embodiments, if the control portion 40 receives a detected output from the tray water level detection switch 45 during the humidifying operation, the control portion 40 turns on the water supply indication lamp of the indication lamps 49 to demand water supply to the water supply tank 16, and continues the humidifying operation. In other words, the humidifying operation is not stopped immediately. Thus, because the air flow into the first air flow passage 31 continues, if water is not supplied to the water tank 16, the humidifying filter 14 loses water gradually to become dry, accordingly, it is possible to prevent limescale from depositing onto the humidifying filter 14, which is sanitary.

In the first and second embodiments, the control portion 40 adjusts the operation of the blower 8, that is, the rotation speed of the fan motor 9 based on a detected output from the temperature sensor 41. Specifically, if a detected output from the temperature sensor 41 indicates a temperature equal to or lower than a given temperature, the rotation speed set for each of the automatic humidifying mode, the weak humidifying mode, and the powerful humidifying mode is changed step by step. This is because the humidifying performance falls, and changing the rotation speed becomes necessary if the air temperature is low.

The present invention is not limited to the embodiments described above, and various modifications can be made without departing from the spirit of the present invention.

INDUSTRIAL APPLICABILITY

The present invention is useful to an air cleaner with a humidifying function.

The invention claimed is:

1. An air cleaner which sucks outside air through an air filter following rotation of a blower disposed in an air flow passage, cleans the sucked air, and sends out the cleaned air to the outside, the air cleaner comprising:
   an air flow passage that extends from the air filter to the blower branches off into a first air flow passage and a second air flow passage which join with each other again;
   a humidifying filter that contains water is disposed in the first air flow passage;
   a movable plate that is disposed in the second air flow passage to open and close the second air flow passage;
   a recess portion that is formed at a front of a main body and houses the air filter; and
   an air flow passage that extends inward from an lower portion of the recess portion, turns upward, and leads to the blower, and the air flow passage is partitioned into upper and lower portions to form the first air flow passage and the second air flow passage in order from the bottom,
   wherein the movable plate is a curved plate that is curved into an arc shape about a pivotal shaft extending along a right-to-left direction and rotates about the pivotal shaft, the movable plate rotates to the most forward position to close the second air flow passage, and rotates to the most backward position not only to open the second air flow passage but also to close a join opening of the first air flow passage, and
   a control portion that controls open and close operation of the movable plate and rotation operation of the blower is disposed.

2. The air cleaner according to claim 1, further comprising a humidity sensor for detecting humidity,
   wherein the control portion opens and closes the movable plate based on a detected value from the humidity sensor.

3. The air cleaner according to claim 1, further comprising an operation portion for receiving an input operation,
   wherein in response to an input operation from the operation portion for an open and close changeover of the movable plate, the control portion changes open and close states of the movable plate, and changes a rotation speed of the blower to obtain substantially the same air flow amount before and after the open and close changeover of the movable plate.

4. The air cleaner according to claim 1, further comprising an operation portion for receiving an input operation,
   wherein in response to an input operation from the operation portion for an open and close changeover of the movable plate, the control portion changes open and close states of the movable plate, and changes a rotation speed of the blower to obtain substantially the same noise level before and after the open and close changeover of the movable plate.

5. The air cleaner according to claim 1, further comprising:
   a removable tray for holding water in which the humidifying filter is immersed;
   a removal water supply tank for supplying water to the tray;
   a tray water level detection portion for detecting that the water held in the tray reaches a water-shortage level; and
   a water supply indication portion for indicating water supply to the water supply tank,
   wherein during execution of an operation mode which when a given operation time elapses, is stopped or automatically moves to another operation mode, in response to a detected output from the tray water level detection portion, the control portion does not indicate water supply until the given operation time elapses, and when the given operation time elapses, the control portion makes the water supply indication portion indicate water supply.

6. The air cleaner according to claim 1, further comprising an operation portion for receiving an input operation,
   wherein in response to an input operation for operation stop from the operation portion, the control portion makes the movable plate rotate to the most forward position and makes the movable plate keep the most forward position.

7. The air cleaner according to claim 1, further comprising an air filter removal detection portion for detecting that the air filter is removed,
   wherein if the control portion receives a detected output from the air filter removal detection portion, the control portion makes the movable plate rotate to the most forward position and makes the movable plate keep the most forward position.

* * * * *